UNITED STATES PATENT OFFICE 2,606,210

3-ALKYL-2,2'-DIHYDROXY-3',5,5',6'-TETRACHLORODIPHENYLMETHANES

Clarence L. Moyle, Clare, and Paul A. Wolf, Midland, Mich., assignors to The Dow Chemical Company, Midland, Mich., a corporation of Delaware No Drawing. Application April 27, 1950,
Serial No. 158,602

3 Claims. (Cl. 260—619)

This invention is concerned with the 3-alkyl-2,2'-dihydroxy-3',5,5',6'-tetrachlorodiphenylmethanes having the formula

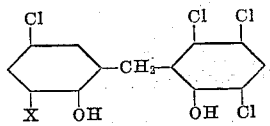

wherein X represents an isopropyl or secondarybutyl radical. The new compounds are crystalline solids, somewhat soluble in many organic solvents, and substantially insoluble in water. They have been found to exert a strong antimicrobial action against bacteria and fungi and may be employed as antimicrobial constituents of fatty acid soaps, synthetic detergent compositions, plastics, rubber goods, cosmetics, surgical dressings, dentifrices, ointments, and creams to render such materials germicidal.

The new compounds may be prepared by various methods. One such method comprises reacting in the presence of an acid condensing agent, such as sulfuric acid, 1 molecular proportion of 4-chloro-2-isopropylphenol or 4-chloro-2-secondarybutylphenol and 1 molecular proportion of 2,4,5-trichlorophenol with 1 molecular proportion of formaldehyde or formaldehyde-yielding substance. When a formaldehyde-yielding substance is employed as a reactant, the amount of such material is equivalent to the amount of formaldehyde desired in the reaction. The amount of sulfuric acid condensing agent to be employed varies over a wide range. Good yields have been obtained when employing about 16 moles of concentrated sulfuric acid per mole of formaldehyde in the mixture. In practice, it is often found advantageous to carry out the reaction in a mixture of sulfuric acid and acetic acid.

In carrying out the reaction, the 4-chloro-2-isopropylphenol or 4-chloro-2-secondarybutylphenol, 2,4,5-trichlorophenol, formaldehyde or formaldehyde-yielding substance, and acetic acid, if employed, are mixed together and the resulting mixture added portionwise over a short period of time to the sulfuric acid. The condensation begins immediately with the production of the desired diphenol compound and water of reaction. The addition is carried out at a temperature of from 0 to 50° C., and the temperature of the reaction mixture subsequently raised to from 50° to 90° C. for a short period of time to complete the reaction. The condensation is somewhat exothermic, and stirring and cooling are generally required to prevent overheating. Upon completion of the reaction, the desired product may be separated in conventional fashion.

The following examples illustrate the invention and are not to be construed as limiting the same:

*Example 1.—2,2'-dihydroxy-3-isopropyl-3',5,5',6'-tetrachlorodiphenylmethane*

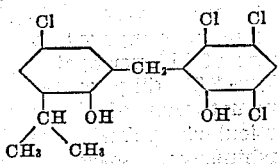

17 grams (0.1 mole) of 4-chloro-2-isopropylphenol (having a freezing point of 43.5° C.), 19.8 grams (0.1 mole) of 2,4,5-trichlorophenol, 3.4 grams of paraformaldehyde (equivalent to 0.113 mole of $CH_2O$), and 20 grams of acetic acid were mixed together and the resulting dispersion added portionwise with stirring and cooling to a mixture of 160 grams of concentrated sulfuric acid and 40 grams of glacial acetic acid. The addition was carried out over a period of twelve minutes and at a temperature of about 0° C. The temperature of the reaction mixture was then gradually raised to about 37° C., stirring continued at this same temperature for 15 minutes, and the reaction mixture thereafter allowed to stand overnight at room temperature. The mixture was then warmed to a temperature of from 65 to 85° C. for 30 minutes to complete the reaction. During the reaction, the crude mixture separated into a liquid acid layer and a sticky amorphous mass. The latter was separated, successively washed with water and dilute aqueous sodium bicarbonate. The crude product was then dissolved in dilute aqueous sodium hydroxide, the resulting mixture separating into a liquid layer and a black tar residue. The liquid layer was separated and poured into dilute hydrochloric acid, the reaction product precipitating as a brown crystalline solid material. The latter was separated, dried, and recrystallized from carbon tetrachloride to obtain 3-isopropyl-2,2'-dihydroxy-3',5,5',6'-tetrachlorodiphenylmethane as a crystalline solid melting at 186 to 187.5° C. and having a chlorine content of 37.9 per cent as compared to a theoretical chlorine content of 37.4 per cent.

*Example 2.—2,2'-dihydroxy-3-secondarybutyl-3',5,5',6'-tetrachlorodiphenylmethane*

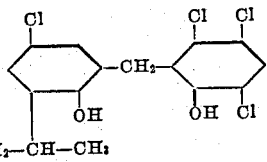

16.5 grams (0.09 mole) of 2-secondarybutyl-4-chlorophenol (having a freezing point of 53.9°

C.), 17.8 grams (0.09 mole) of 2,4-5-trichlorophenol, 13 grams of acetic acid, and 3.1 grams of paraformaldehyde (equivalent to 0.106 mole of $CH_2O$) were mixed together and the resulting dispersion added portionwise with stirring and cooling to a mixture of 120 grams of concentrated sulfuric acid and 30 grams of glacial acetic acid. The addition was carried out at a temperature of 26° C. and the resulting mixture thereafter warmed at a temperature of from 36 to 38° C. for 20 minutes. The temperature of the reaction mixture was then raised to 78° C. for 25 minutes to complete the reaction. During the reaction, the crude mixture separated into a liquid acid layer and a sticky amorphous mass. The latter was separated, washed with water, and air-dried. The crude product was then successively recrystallized from a petroleum distillate boiling from 86–100° C. (Skellysolve) and carbon tetrachloride to obtain 2,2'-dihydroxy-3-secondarybutyl-3',5,5',6'-tetrachlorodiphenylmethane as crystalline solid melting at 135° to 136° C. and having a chlorine content of 35.52 per cent as compared to a theoretical chlorine content of 36.0 per cent.

The 3 - alkyl - 2,2' - dihydroxy-3',5,5',6'-tetrachlorodiphenylmethanes of the present invention are particularly valuable as constituents of toilet, washing, and so-called liquid soaps. When the new compounds are incorporated in soap compositions, they retain their germicidal effectiveness against a number of bacterial organisms. In preparing such soap compositions, the diphenol compound may be added directly to the detergent soap during the crutching, milling or similar operation. Another mode of operation comprises dissolving the germicidal diphenol in a small amount of a suitable solvent such as alcohol or acetone, and dispersing the resulting solution in the detergent soap. In general, any method which results in the germicidal agents' being uniformly distributed in the final soap product is satisfactory. Suitable concentrations of the germicides in the new soap compositions are in the order of from 1 to 3 per cent by weight of the soap.

Aqueous soap compositions, containing the compounds of the preceding examples, were tested for the control of *Staphylococcus aureus*. In such operations, 100 per cent kills of the test organism were obtained in from 2 to 3 minutes with concentrations of the diphenol agents of 1 part in 10,000 to 1 part in 12,000.

We claim:

1. A 3 - alkyl - 2,2'-dihydroxy-3',5,5',6'-tetrachlorodiphenylmethane having the formula

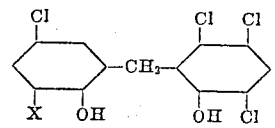

wherein X represents a member of the group consisting of the isopropyl and secondarybutyl radicals.

2. 2,2' - dihydroxy-3-isopropyl-3',5,5',6'-tetrachlorodiphenylmethane.

3. 2,2' - dihydroxy-3-secondarybutyl-3',5,5',6'-tetrachlorodiphenylmethane.

CLARENCE L. MOYLE.
PAUL A. WOLF.

REFERENCES CITED

The following references are of record in the file of this patent:

UNITED STATES PATENTS

| Number | Name | Date |
| --- | --- | --- |
| 1,967,825 | Klarmann et al. | July 24, 1934 |
| 2,250,480 | Gump | July 29, 1941 |

FOREIGN PATENTS

| Number | Country | Date |
| --- | --- | --- |
| 417,785 | Great Britain | Oct. 8, 1934 |

OTHER REFERENCES

Florestano: J. Pharmacol. Exptl. Therapy, vol. 96 (1949), pages 238–49 (12 pages), 260–619.